Sept. 2, 1930.    F. W. LEONHARD    1,774,605
APPARATUS FOR LIFTING AUTOMOBILES AND THE LIKE
Filed Aug. 2, 1926    3 Sheets-Sheet 1
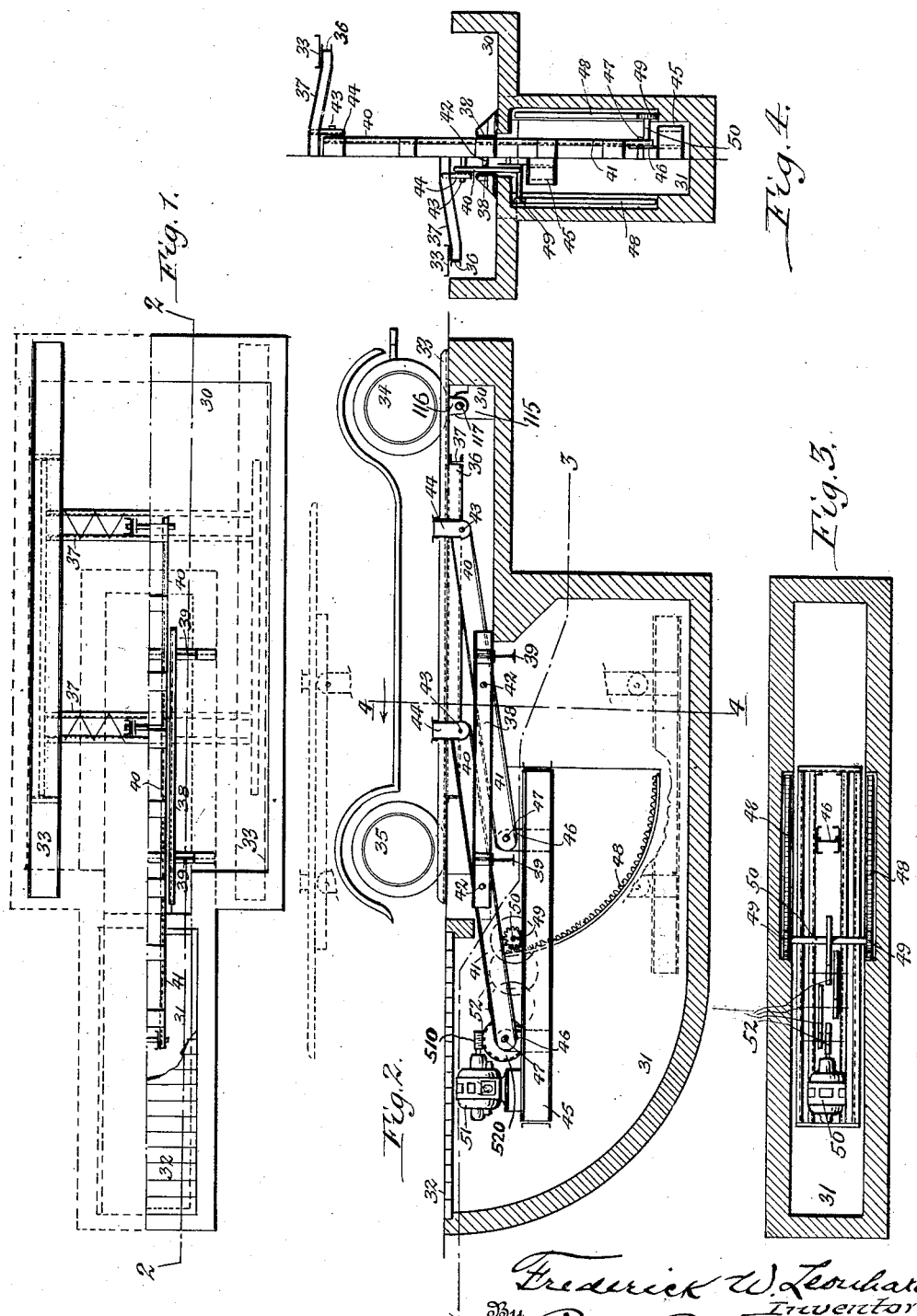

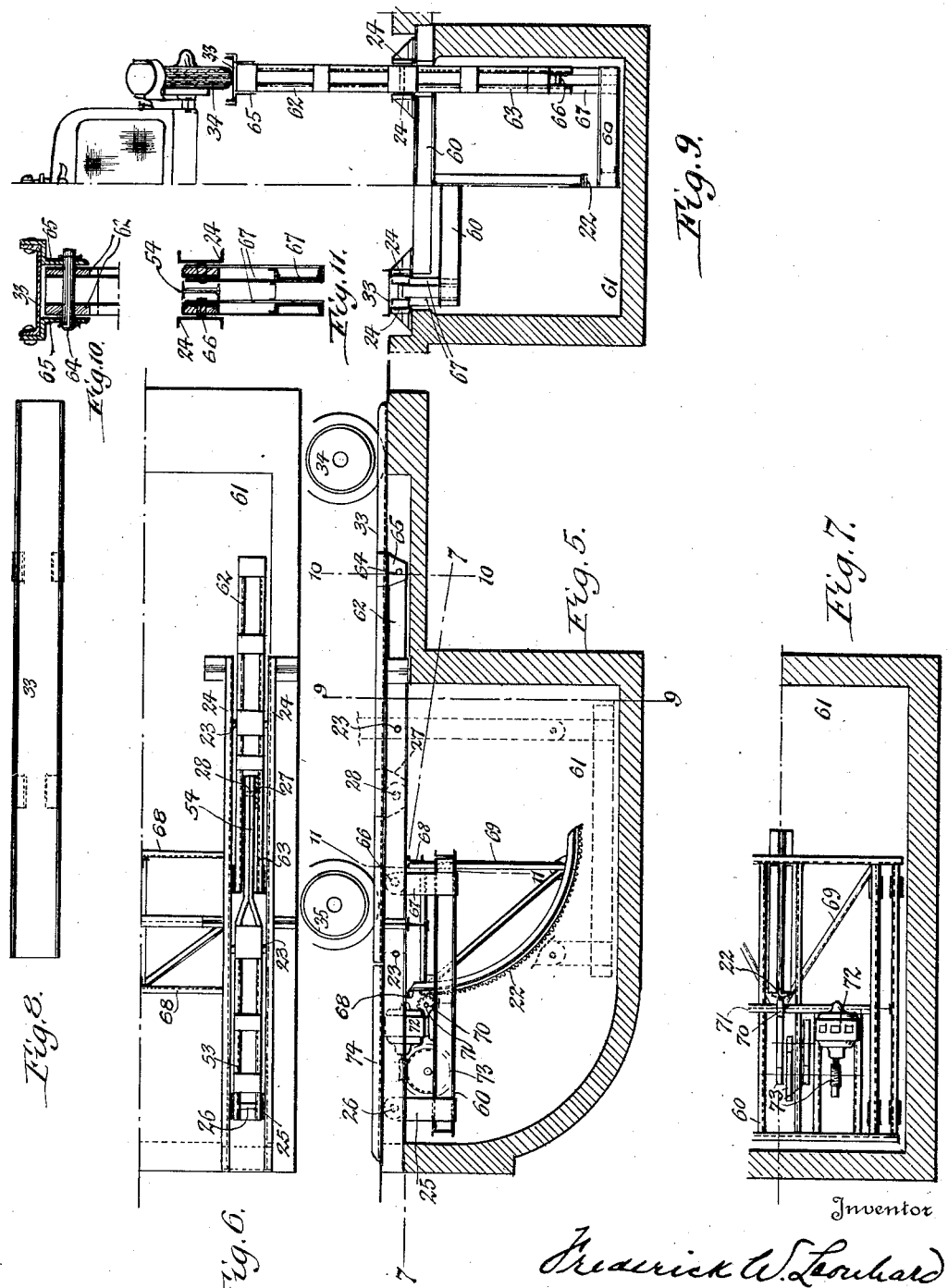

Sept. 2, 1930. F. W. LEONHARD 1,774,605
APPARATUS FOR LIFTING AUTOMOBILES AND THE LIKE
Filed Aug. 2, 1926 3 Sheets-Sheet 3
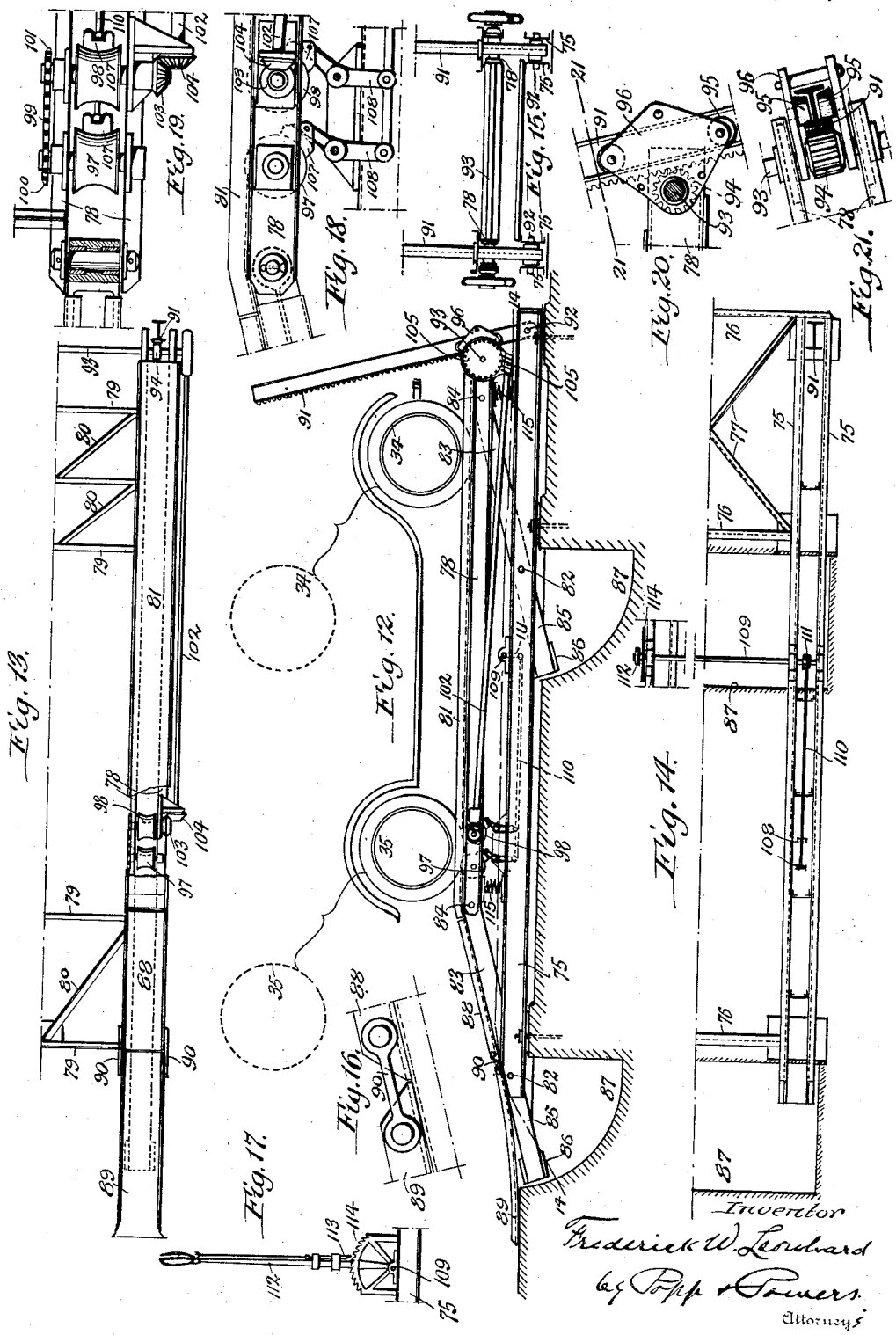

Patented Sept. 2, 1930

1,774,605

UNITED STATES PATENT OFFICE

FREDERICK W. LEONHARD, OF BUFFALO, NEW YORK

APPARATUS FOR LIFTING AUTOMOBILES AND THE LIKE

Application filed August 2, 1926. Serial No. 126,358.

This invention relates to an apparatus for lifting an automobile or the like from the ground or floor so that convenient access may be had to the underside of its running gear and other parts for the purpose of inspection, repairing, removal of engine oil, painting, cleaning and other purposes.

It is the object of this invention to produce an apparatus whereby this purpose may be accomplished easily, conveniently and expeditiously, which can be readily mounted on the floor of a building or arranged over a pit therein as desired or required, and which may be operated by power derived from the automobile which is to be lifted.

In the accompanying drawings:

Figure 1 is a plan view of one form of automobile lifting apparatus embodying my invention, the upper half showing the main parts of the car platform and the lower half the main parts arranged in the pit below the platform. Figure 2 is a vertical longitudinal section of the automobile lifting apparatus taken on line 2—2, Fig. 1. Figure 3 is a horizontal section taken on the correspondingly numbered line in Fig. 2. Figure 4 is a vertical transverse section taken on line 4—4, Fig. 2, and showing the platform lowered in the left half and raised in the right half of the same. Figure 5 is a vertical longitudinal section of a modified form of my invention. Figure 6 is a plan of one-half of the structure shown in Fig. 5 below the platform. Figure 7 is a horizontal section taken on line 7—7, Fig. 5, showing one-half of the structure. Figure 8 is a plan view of one of the elevating tracks of the platform shown in Fig. 5. Figure 9 is a vertical transverse section taken on line 9—9, Fig. 5, the left half showing the platform lowered and the right half raised. Figures 10 and 11 are vertical cross sections, on an enlarged scale, taken on the correspondingly numbered lines in Fig. 5. Figure 12 is a side view of the apparatus and the ground in a vertical longitudinal section showing an other embodiment of my invention. Figure 13 is a top plan view of the same, including one-half of the platform. Figure 14 is a horizontal section taken on line 14—14 of Fig. 12 and showing part of brake mechanism for controlling the elevating mechanism. Figure 15 is a fragmentary front elevation of the apparatus shown in Fig. 12. Figure 16 is a side elevation, on an enlarged scale, of the pivotal connection between the intermediate and first sections of the runway leading to the rear end of one of the tracks or beds of the platform shown in Fig. 12. Figure 17 is a side elevation of the lever for controlling the brakes of the elevating mechanism. Figure 18 is a side elevation, on an enlarged scale, of the brake mechanism for controlling the operation of the elevating mechanism. Figure 19 is a top plan view thereof, partly in section. Figure 20 is a fragmentary side elevation, on an enlarged scale, of the platform elevating mechanism. Figure 21 is a horizontal section taken on line 21—21, Fig. 20.

Similar characters of reference indicate like parts in the several figures of the drawings.

In its general organization this automobile lifting apparatus comprises a platform which is adapted to receive an automobile, a lifting mechanism adapted to raise and lower the platform, a base on which the lifting mechanism is mounted, and, if desired, power driven means for actuating the lifting mechanism.

My invention may be embodied in various practical forms and the accompanying drawings represent three adaptations of the same. That shown in Figs. 1-4 is constructed as follows:

In the ground or floor of a building a pit is provided which has a wide, long and shallow part 30 and a narrow, short and deep part 31, which pit may be lined with concrete walls or finished in any other approved manner. The top of the wide part of the pit is open but the front end of the narrow part which extends rearwardly from the wide part is normally closed or bridged by a removable grate or cover 32. The platform is arranged over the wide part of the pit and substantially on a level with the same when in position for running a car on or off the platform. In the construction of the platform shown in Figs. 1–4, the same comprises two main longitudinal tracks 33, 33, of channel or trough form which are of such length and spaced apart such distance that the automobile can be run with its front and rear wheels 34, 35, onto these tracks and therefore properly supported throughout its length. On its underside each of the main tracks is reinforced by a longitudinal beam 36 and at intervals the beams of both main tracks are connected by cross pieces 37, the ends of which are depressed and the central parts elevated, as shown in Fig. 4, so as to permit of bringing the main tracks down to the level of the pit and still provide the requisite room for mounting the central part of the platform conveniently on the lifting mechanism.

The lifting mechanism is so organized that its members operate in the manner of a parallelogram and maintain the platform, and the automobile mounted thereon, constantly in a horizontal position. The lifting mechanism shown in Figs. 1–4 is arranged within the pit and mounted on a base therein, which base in the form here shown comprises two stationary longitudinal supporting beams 38, 38, arranged in the upper central part of the pit and two cross beams 39, 39, carrying the supporting beams and resting at opposite ends on the side walls of the pit.

The lifting mechanism in this instance comprises two vertically swinging lifting levers of equal length arranged one in front of the other in the space between the base beams 38 and pivotally mounted thereon between their upper and lower arms 40, 41 by means of horizontal cross pins 42. The upper arms 40 of these levers are of equal length and pivotally connected with the platform by means of horizontal transverse pins 43 passing through the extremities of the upper arms and lugs 44 depending from the central parts of the platform cross pieces 37. The platform, base and upper arms of the lifting levers therefore form a parallelogram which maintains the automobile resting on the platform constantly in parallelism with the ground or floor and avoids any tendency of the same to roll off the platform while being raised or lowered. If desired, however, means may be employed for blocking or locking the car on the platform so as to additionally guard against displacement of the car on the platform while being raised or lowered. The weight of the car is preferably counterbalanced so as to permit of raising and lowering the same easily and for this purpose a counterweight is employed consisting, for example, of a longitudinal counterweight beam 45 arranged within the narrow part of the pit and provided with upwardly projecting lugs 46 which are pivotally connected by horizontal transverse pins 47 with the lower arms 41 of the lifting levers so as to form a lower parallelogram with same and the base.

In the lower position of the platform the front and rear ends of its main tracks rest on the front and rear cross walls of the pit, as shown by full lines in Fig. 2, in which position the car can be easily run on and off the platform. While the platform is in its lowered position the upper arm of the rear lifting lever overhangs the lower arm of the front lifting lever and thus limits the folding action of these levers due to the same being in longitudinal alinement.

It will be noted that the transverse beams 39 supporting the two longitudinal beams 38, 38 are each located adjacent to and slightly in advance of the cross pins 42 which pivotally support the vertically swinging lifting levers. By this means the beams 38, 38 are supported at their ends and adjacent the load thereon and at the same time these transverse beams do not interfere with the action of the lifting mechanism either in the elevated or collapsed position thereof.

By properly counterbalancing the platform it is possible to raise the same manually with the automobile mounted thereon to the position shown by dotted lines in Fig. 2 so that an auto mechanic can get under the car and attend to all requirements of the same without the necessity of getting down into the pit as has been the custom heretofore, thereby avoiding the hazards attending the entrance of the pit such as being overcome by gas, and the danger of being overlooked in case of accidents.

Instead of raising and lowering the platform manually this may be accomplished by power. An example of such an installation is shown in Figs. 2, 3, and 4, consisting of two segmental or curved gear racks 48 mounted on the side walls of the narrow part of the pit, gear pinions 49 meshing with said racks, a driven shaft 50 journaled transversely in bearings on the counterweight beam and carrying said pinions at its opposite ends, a prime mover, preferably an electric motor 51, mounted on the counterweight beam, and a train 52 of intermediate gearing mounted on this beam and operating to transmit motion from said motor to said pinions for causing them to either run up or down on said rack for lowering or raising the platform. This motor may be so wound that the same can run either forwardly or backwardly and manually controlled switch means of any suitable or well known character may be employed for controlling the operations of the motor.

This intermediate gearing 52 includes a worm wheel 520 operatively connected with the gear pinion 50 and a worm 510 which is operatively connected with the motor 51 whereby this worm and worm wheel serve to hold the platforms and levers in whatever position they may be whenever the motor is stopped and therefore prevent accidental movement of the platforms and levers and the load imposed on the same without requiring any other locking device for this purpose.

Instead of employing a single pair of lifting levers which connect with the central part of the platform, as shown in Figs. 1–4, two pairs of such levers may be employed, one pair under each of the main tracks, as shown in Figs. 5–9. In this last mentioned construction the front lever of each pair has upper and lower arms 62, 63, each of which is made up of two longitudinal bars spaced apart throughout their entire length, and the upper arm being pivotally connected by a pivot pin 64 with a downwardly projecting lug 65 on the front part of one of the main tracks 33 of the auto supporting platform, while the lower arm 63 thereof is connected by a pivot pin 66 with upwardly projecting lugs 67 on the front part of a counterbalancing frame 60 in the pit 61. The rear lifting lever of each pair has two side bars which are spaced apart at their lower ends and form a lower arm 53 but brought close together with their upper parts to form an upper arm 54. Each of these rear levers is pivotally connected at its upper end by a pin 28 with a depending lug 27 on one of the platform tracks and also pivotally connected at its lower end by a pin 26 with upwardly projecting lugs 25 on the counterbalancing frame 60. By this construction of the front and rear levers of each pair the same may be arranged lengthwise in line and still folded relatively to each other so that the same are both horizontal when the platform is in its lowermost position, as shown in Fig. 5, this being possible by reason of the narrow upper arm of each rear lifting lever being received between the spaced apart lower bars of the lower arm of the companion front lever, as shown in Fig. 6. Each pair of lifting levers is arranged between a pair of longitudinal beams 24 of the base and pivoted thereto between their arms by horizontal pins 23. The two tracks of the platform in this instance are not connected with each other by cross pieces, thereby leaving the space underneath the car between its wheels unobstructed and accessible for cleaning, repairing, etc.

The power mechanism for actuating the lifting mechanism in the construction shown in Figs. 5–11 comprises a single segmental gear or rack 22 mounted centrally within the pit by means of a cross beam 68 connected with the beams 24 and connected by braces 69 with the gear segment, a gear pinion 70 meshing with said rack, a driven shaft 71 journaled on the counterbalancing frame 60 and carrying said gear pinion, an electric motor 72 mounted on the counterbalancing frame, and a train of intermediate gearing 73 connecting said motor with said driven shaft. The platform in the construction shown in Figs. 5–11 can be raised and lowered either manually or by power similar to the manner described with reference to the construction shown in Figs. 1–4. In the construction shown in Fig. 5 a guide track section 74 is arranged above the pit in line with the rear end of said platform track for guiding the respective auto wheels to and from the platform track.

If desired, my improved automobile lifting apparatus may be so designed that the pit may be omitted and all the working parts arranged above the level of the ground or floor. Such a construction is shown in Figs. 12–21, the same being as follows:

Above the floor or ground is arranged a base which comprises two longitudinal beams, each of which has two side bars 75, which are spaced apart and the inner bars of both of these beams being connected by cross pieces 76 and braces 77. Above each of these base beams is arranged one of the platform beams which consists of two longitudinal spaced apart bars 78. The corresponding upper arms 83 of the front and rear lifting levers are connected with each other by cross bars 79 and braces 80. Mounted on top of each platform beam is a main or platform track 81 of channel or trough form which receive the respective wheels of the automobile being elevated. The mechanism for lifting the platform comprises two pairs of lifting levers, the members of each pair being arranged between the front and rear parts of the bars of one of the base beams and pivoted thereto by a transverse pin 82. Each lifting lever bar has its upper arm 83 pivoted by a pin 84 to the adjacent platform beam and its lower arm 85 provided with a counterbalancing weight 86. In order to provide the necessary clearance for the weighted lower arms of the lifting levers pockets 87 are formed in the floor or ground to receive these lower arms, as shown in Figs. 12 and 14.

Upon swinging the lifting levers vertically the platform will be raised or lowered together with the auto or other load supported thereon. For the purpose of conveniently guiding a car on and off the main tracks of the platform auxiliary tracks are provided, each of which comprises an intermediate section 88 secured to the upper arm of one of the rear lifting levers in line with the respective platform track, and a rear section 89 arranged in line with one of the intermediate sections and resting loosely at its rear end on the floor or ground while its front end is pivotally connected by links 90 with the rear end of the adjacent intermediate track section, as shown in Figs. 12, 13 and 16.

The means for raising and lowering the platform by power shown in Figs. 12–21 are constructed as follows:

The numerals 91, 91 represent two upright gear racks arranged in front of the main rails or tracks of the platform and pivoted at their lower ends to the front ends of the base beams by transverse pins 92. Journaled transversely on the front end of the platform is a horizontal intermediate shaft 93 which is provided with gear pinions 94 meshing with the racks 91. Upon turning the shaft in one direction or the other the pinions 94 roll up or down on the racks and raise or lower the platform together with the auto or other load thereon. The racks and the platform are maintained in the proper relation to each other during this relative movement of the platform and the racks by constructing the racks of I form in cross section and engaging the channels of each by guide rollers 95 which are mounted on a yoke 96 embracing the respective rack and mounted on the shaft 93, as best shown in Figs. 20 and 21. Rotation of the lifting shaft 93 is effected in this instance by motion derived from the engine of the automobile which is being elevated or depressed. This is accomplished in the following manner:

The numerals 97, 98, represent two peripherally grooved driving rollers arranged below an opening in each main platform track where the respective rear or driving wheel of the car is located when the latter has been driven into the proper position on the platform to be raised and lowered whereby the driving wheels of the car are caused to rest upon these driving rollers respectively. The latter are preferably caused to turn in unison by a chain belt 99 passing around sprocket wheels 100, 101 on the axles of these rollers, as shown in Figs. 13 and 19. Motion is transmitted from one roller of each pair of driving rollers 97, 98 to the lifting shaft 93 by a longitudinal intermediate shaft 102 journaled lengthwise on the outer side of one of the platform beams, intermeshing bevel gear wheels 103, 104 connected respectively with the axle of the roller 98 and the rear end of the intermediate shaft 102, and an intermeshing worm 105 and worm wheel 106 secured respectively to the front end of the intermediate shaft 102 and the lifting shaft 93, as shown in Figs. 12, 13, 15, 18 and 19.

After the auto has been run onto the platform and the rear or driving wheels of the same are engaged with the driving rollers of the platform then the engine upon being operated will rotate the driving rollers and cause the platform to be raised from the base. After the necessary work has been done on the underside of the car a reversal of the motor of the car driving wheels will cause the driving rollers of the platform to turn in the opposite direction and the platform to be lowered.

Means are provided whereby the operator can control the rotation of the driving rollers and prevent the platform from being affected before everything is ready, and also enable the car to be driven off the platform without putting undue stress on the operating mechanism. For this purpose each driving roller is engaged on its periphery by a brake shoe 107 mounted on the upper arm of a brake lever 108, which is pivoted on the adjacent beam of the base, a brake shaft 109 journaled transversely on the base, a shifting rod 110 connecting the lower arms of the brake levers with a depending arm 111 on the brake shaft, a hand lever 112 connected with the brake shaft, and a pawl and ratchet locking device 113, 114 for holding said lever in its locked position, as shown in Figs. 12, 14 and 17. When the platform is lowered the brake shoes are applied to the driving rollers 97, 98, and held there by the hand lever 112 and its locking device, so as to prevent the lifting mechanism from affecting the platform when the driving wheels of the auto come into engagement therewith. Before coupling the engine with the driving wheels while the car is on the depressed platform the brakes are released so that upon subsequently rotating the driving wheels of the car by its motor the platform will ascend without interference. In like manner the brakes may be utilized for controlling rotation of the driving rollers while the platform is elevated preparatory to effecting a descent. When the platform has been lowered the brakes 107 are applied to prevent the rollers 97, 98 from turning and thus enable the driving wheels of the car to roll off the platform.

In order to prevent the platform and its load when lowered from jarring the apparatus at the end of the downward movement, cushioning means are provided which may consist of springs 115 mounted on the upper sides of the base beams and adapted to be engaged by the undersides of the platform beams, as shown in Fig. 12.

Each of the several forms of my invention herein shown is compact in construction and capable of being readily installed where only a limited amount of space is available. The automobile can be quickly raised and lowered and reliably held in an elevated position so that a workman can perform his duties without endangering himself, and the operation of elevating and depressing the car can be effected without undue manual labor.

In order to guard against possible rising of the platform when no car is present on the same or the car to be lifted is lighter than the counterweight a locking device may be provided to hold the supporting platform positively in its lowered position which can be released at will when it is desired to lift the car. A locking device suitable for this purpose is shown in Fig. 2, consisting of cooperating lugs 115, 116 which are mounted on the base and supporting platform, respectively, and a locking pin 117 adapted to be passed through or removed manually from these lugs for coupling or uncoupling them, and thereby either holding the platform against rising or permitting the same to rise. The gear pinion 49 is mounted on the counterweight platform midway between the pivots 47 of the respective front and rear lifting levers and the gear pinions 70 are similarly mounted on the counterweight platform between the pivots 23 of the respective front and rear lifting levers, whereby the pull of the mechanism for raising and lowering the car-supporting platform is exerted uniformly on the front and rear lifting levers and produces a uniform strain on the parts.

I claim as my invention:

1. An automobile lifting apparatus comprising a platform which is adapted to receive the automobile and support the same so as to expose the underside thereof, and shifting means for raising and lowering said platform, comprising a base, vertically swinging lifting levers pivoted on said base and having upper arms which are pivotally connected with said platform, and also having downwardly projecting arms and counterweights mounted on said lower arms.

2. An automobile lifting apparatus comprising a platform which is adapted to receive the automobile and support the same so as to expose the underside thereof, and shifting means for raising and lowering said platform, comprising a base, vertically swinging lifting arms which are pivotally connected at their upper ends with opposite ends of said platform and at their lower parts with opposite ends of said base, and power operated means for actuating said shifting means comprising a gear rack connected with said base, and a gear pinion mounted on a part connected with said platform and meshing with said gear rack.

3. An automobile lifting apparatus comprising a platform which is adapted to receive the automobile and support the same so as to expose the underside thereof, and shifting means for raising and lowering said platform, comprising a base, vertically swinging lifting arms which are pivotally connected at their upper ends with opposite ends of said platform and at their lower parts with opposite ends of said base, and power operated means for actuating said shifting means comprising a gear rack connected with said base, a gear pinion mounted on a part connected with said platform and meshing with said gear rack, and a prime mover operatively connected with said pinion.

4. An automobile lifting apparatus comprising a platform adapted to receive the automobile, a base, vertically swinging members pivotally connected at their upper ends with the opposite ends of said platform and pivotally connected with said base, one of said members having its sides spaced apart and the other member having part of its sides brought together and adapted to enter between said spaced apart sides in the lowered position of said platform.

5. An automobile lifting apparatus comprising a supporting platform adapted to support an automobile, a base, a plurality of lifting levers pivoted between their upper and lower arms to the base on a horizontal plane and the upper arms of said levers being pivoted to said supporting platform on a horizontal plane so that the supporting platform, base and upper arms together form an upper parallelogram, and a counterweight platform pivotally connected with the lower arms of said levers on a horizontal plane so that the counterweight platform, base and lower arms form a lower parallelogram.

6. An automobile lifting apparatus comprising a supporting platform adapted to support an automobile, a base, a plurality of lifting levers pivoted between their upper and lower arms to the base on a horizontal plane and the upper arms of said levers being pivoted to said supporting platform on a horizontal plane so that the supporting platform, base and upper arms together form an upper parallelogram, a counterweight platform pivotally connected with the lower arms of said levers on a horizontal plane so that the counterweight platform, base and lower arms form a lower parallelogram, said base comprising a longitudinal beam to which said levers are pivoted, and a transverse beam which supports said longitudinal beam between the fulcrums of said levers.

7. An automobile lifting apparatus comprising a supporting platform adapted to support an automobile, a base, a plurality of lifting levers pivoted between their upper and lower arms to the base on a horizontal plane and the upper arms of said levers being pivoted to said supporting platform on a horizontal plane so that the supporting platform, base and upper arms together form an upper parallelogram, a counterweight platform pivotally connected with the lower arms of said levers on a horizontal plane so that the counterweight platform, base and lower arms form a lower parallelogram, and means for turning said levers and moving the parts connected therewith comprising a stationary gear rack, a gear pinion mounted on said counterweight platform and meshing with said rack, and a motor mounted on the counterweight platform and operatively connected with said gear pinion.

8. An automobile lifting apparatus comprising a supporting platform adapted to support an automobile, a base, a plurality of lifting levers pivoted between their upper and lower arms to the base on a horizontal plane and the upper arms of said levers being pivoted to said supporting platform on a horizontal plane so that the supporting platform, base and upper arms together form an upper parallelogram, a counterweight platform pivotally connected with the lower arms of said levers on a horizontal plane so that the counterweight platform, base and lower arms form a lower parallelogram, and means for turning said levers and moving the parts connected therewith, comprising a stationary gear rack arranged adjacent to the central part of said counterweight platform, a gear pinion mounted on the counterweight platform and meshing with said gear rack, and a motor mounted on the counterweight platform and operatively connected with said gear pinion.

9. An automobile lifting apparatus comprising a supporting platform adapted to support an automobile, a base, a plurality of lifting levers pivoted between their upper and lower arms to the base on a horizontal plane and the upper arms of said levers being pivoted to said supporting platform on a horizontal plane so that the supporting platform, base and upper arms together form an upper parallelogram, a counterweight platform pivotally connected with the lower arms of said levers on a horizontal plane so that the counterweight platform, base and lower arms form a lower parallelogram, and means for turning said levers and moving the parts connected therewith comprising a stationary gear rack, a gear pinion mounted on said counterweight platform midway of the pivotal connections between said lower arms and said counterweight platform and meshing with said gear rack, and a motor mounted on the counterweight platform and operatively connected with said gear pinion.

10. An automobile lifting apparatus comprising a supporting platform adapted to support an automobile, a base, a plurality of lifting levers pivoted between their upper and lower arms to the base on a horizontal plane, and the upper arms of said levers being pivoted to said supporting platform on a horizontal plane, and a counterweight platform pivotally connected with the lower arms of said levers on a horizontal plane so that said counterweight platform, levers and supporting platform together form a parallelogram.

11. An automobile lifting apparatus comprising a supporting platform adapted to support an automobile, a base, a plurality of lifting levers pivoted between their upper and lower arms to the base on a horizontal plane, and the upper arms of said levers being pivoted to said supporting platform on a horizontal plane, a counterweight platform pivotally connected with the lower arms of said levers on a horizontal plane so that counterweight platform, levers and supporting platform together form a parallelogram, and means operatively connected with said counterweight platform and a stationary part for raising and lowering said platform.

12. An automobile lifting apparatus comprising a supporting platform adapted to support an automobile, a base, a plurality of lifting levers pivoted between their upper and lower arms to the base on a horizontal plane, and the upper arms of said levers being pivoted to said supporting platform on a horizontal plane, a longitudinal beam pivotally connected with the lower arms of said levers on a horizontal plane so that said levers, longitudinal beam and platform together form a parallelogram, and means connected with said longitudinal beam and a stationary part for raising and lowering said platform.

13. An automobile lifting device comprising a supporting platform adapted to support an automobile, a pair of horizontal base beams, a plurality of lifting levers pivoted between their upper and lower arms to said base beams, the upper arms of said levers being pivoted to said platform on a horizontal plane, a counterweight platform pivotally connected to the lower arms of said levers on a horizontal plane, so that said counterweight platform, levers and supporting platform together form a parallelogram, and transverse beams supporting said base beams adjacent to the pivotal connections between said base beams and lifting levers.

14. An automobile lifting device comprising a supporting platform adapted to support an automobile, a pair of horizontal base beams, a plurality of lifting levers pivoted between their upper and lower arms to said base beams, the upper arms of said levers being pivoted to said platform on a horizontal plane, a counterweight platform pivotally connected to the lower arms of said levers on a horizontal plane, so that said counterweight platform, levers and supporting platform together form a parallelogram the upper portion of which parallelogram swings forwardly to a closed position, and transverse beams arranged under said base beams and supporting said base beams at points adjacent to and in advance of the pivotal connections between said base beams and lifting levers.

15. An automobile lifting apparatus comprising a supporting platform, a base, lifting members pivoted to said base and platform and forming a parallelogram therewith, and means for shifting said levers and platform comprising a stationary gear rack, a gear pinion mounted on a part of said parallelogram and meshing with said gear rack, a motor mounted on a part of said parallelogram, and means for transmitting motion from said motor to said gear pinion including a worm wheel operatively connected with said gear pinion, and a worm, meshing with said worm wheel and operatively connected with said motor.

In testimony whereof I hereby affix my signature.

FREDERICK W. LEONHARD.